(12) United States Patent
Pointer

(10) Patent No.: US 7,664,067 B2
(45) Date of Patent: Feb. 16, 2010

(54) PRESERVING SOCKET CONNECTIONS OVER A WIRELESS NETWORK

(75) Inventor: Robey Pointer, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 464 days.

(21) Appl. No.: 11/305,789

(22) Filed: Dec. 15, 2005

(65) Prior Publication Data

US 2009/0103515 A1   Apr. 23, 2009

(51) Int. Cl.
*H04W 4/00* (2006.01)
(52) U.S. Cl. ..................................... 370/328
(58) Field of Classification Search ......... 370/216–228, 370/328; 455/63.1, 8
See application file for complete search history.

(56) References Cited

U.S. PATENT DOCUMENTS

| | | | |
|---|---|---|---|
| 4,237,540 A | | 12/1980 | Sato |
| 5,045,997 A | * | 9/1991 | Watanabe .................. 711/158 |
| 5,159,592 A | | 10/1992 | Perkins |
| 5,224,060 A | | 6/1993 | Ma |
| 5,268,817 A | | 12/1993 | Miyagawa |
| 5,400,322 A | * | 3/1995 | Hunt et al. .................. 370/468 |
| 5,485,197 A | | 1/1996 | Hoarty |
| 5,546,447 A | | 8/1996 | Skarbo et al. |
| 5,548,477 A | | 8/1996 | Kumar |
| 5,548,478 A | | 8/1996 | Kumar |
| 5,559,800 A | | 9/1996 | Mousseau et al. |
| 5,579,472 A | | 11/1996 | Keyworth et al. |
| 5,594,910 A | | 1/1997 | Filepp et al. |
| 5,598,523 A | | 1/1997 | Fujita |
| 5,608,446 A | | 3/1997 | Carr et al. |
| 5,623,613 A | | 4/1997 | Rowe et al. |
| 5,638,257 A | | 6/1997 | Kumar |
| 5,650,827 A | | 7/1997 | Tsumori et al. |

(Continued)

FOREIGN PATENT DOCUMENTS

EP   1 071 024   1/2001

(Continued)

OTHER PUBLICATIONS

IBM Technical Disclosure Bulletin, "Multimedia Telephone Caller Recognition" vol. 34, No. 10A, Mar. 1992, pp. 315-316.

(Continued)

*Primary Examiner*—Lester Kincaid
*Assistant Examiner*—Steven Lim

(57) ABSTRACT

A system, apparatus, and method for maintaining a socket connection over a wireless network. For example, one embodiment of the invention is a wireless data processing device for emulating a socket connection comprising: a wireless radio for establishing a wireless communication channel with a wireless service provider over a wireless network; a network protocol stack including at least one layer configured to establish a socket connection with a remote server over the wireless network, the network protocol stack further including an application layer for executing applications capable of transmitting and receiving data over the socket connection; and a resumable socket module configured to emulate an open socket connection transparently to applications within the application layer, even when the wireless communication channel is temporarily lost, the resumable socket module counting a number of bytes transmitted or to be transmitted to the remote server and maintaining a buffer containing the bytes transmitted or to be transmitted.

12 Claims, 4 Drawing Sheets

U.S. PATENT DOCUMENTS

| | | | |
|---|---|---|---|
| 5,687,331 | A | 11/1997 | Volk et al. |
| 5,715,387 | A | 2/1998 | Barnstijn et al. |
| 5,727,159 | A | 3/1998 | Kikinis |
| 5,727,202 | A | 3/1998 | Kucala |
| 5,748,084 | A | 5/1998 | Isikoff |
| 5,778,176 | A | 7/1998 | Geihs et al. |
| 5,790,974 | A | 8/1998 | Tognazzini |
| 5,793,415 | A | 8/1998 | Gregory et al. |
| 5,802,312 | A | 9/1998 | Lazaridis et al. |
| 5,816,620 | A | 10/1998 | Buell |
| 5,900,848 | A | 5/1999 | Haneda |
| 5,915,095 | A | 6/1999 | Miskowiec |
| 5,940,076 | A | 8/1999 | Sommers et al. |
| 5,949,408 | A | 9/1999 | Kang |
| 5,961,590 | A | 10/1999 | Mendez et al. |
| 5,964,830 | A | 10/1999 | Durrett |
| 5,969,678 | A | 10/1999 | Stewart |
| 5,983,261 | A | 11/1999 | Riddle |
| 5,987,609 | A | 11/1999 | Hasebe |
| 6,023,708 | A | 2/2000 | Mendez et al. |
| 6,028,600 | A | 2/2000 | Rosin et al. |
| 6,035,339 | A | 3/2000 | Agraharam et al. |
| 6,038,601 | A | 3/2000 | Lambert et al. |
| 6,076,093 | A | 6/2000 | Pickering |
| 6,076,109 | A | 6/2000 | Kikinis |
| 6,081,708 | A | 6/2000 | Vasnier |
| 6,087,937 | A | 7/2000 | McCarthy |
| 6,151,677 | A | 11/2000 | Walter et al. |
| 6,157,935 | A | 12/2000 | Tran et al. |
| 6,166,734 | A | 12/2000 | Nahi et al. |
| 6,167,441 | A | 12/2000 | Himmel |
| 6,199,099 | B1 | 3/2001 | Gershman et al. |
| 6,211,921 | B1 | 4/2001 | Cherian et al. |
| 6,249,530 | B1 | 6/2001 | Blanco et al. |
| 6,266,098 | B1 | 7/2001 | Cove et al. |
| 6,266,400 | B1 | 7/2001 | Castagna |
| 6,282,435 | B1 | 8/2001 | Wagner |
| 6,286,063 | B1 | 9/2001 | Bolleman et al. |
| 6,317,789 | B1 | 11/2001 | Rakavy et al. |
| 6,330,618 | B1 | 12/2001 | Hawkins et al. |
| 6,336,137 | B1 | 1/2002 | Lee |
| 6,370,687 | B1 | 4/2002 | Shimura |
| 6,396,482 | B1 | 5/2002 | Griffin et al. |
| 6,411,307 | B1 | 6/2002 | Rosin et al. |
| 6,418,310 | B1 | 7/2002 | Dent |
| 6,433,777 | B1 | 8/2002 | Sawyer |
| 6,438,101 | B1 | 8/2002 | Kalampoukas et al. |
| 6,438,601 | B1 | 8/2002 | Hardy |
| 6,446,004 | B1 | 9/2002 | Cao |
| 6,448,987 | B1 | 9/2002 | Easty et al. |
| 6,449,255 | B1 | 9/2002 | Waclawsky |
| 6,490,251 | B2 | 12/2002 | Yin et al. |
| 6,493,316 | B1 | 12/2002 | Chapman et al. |
| 6,510,144 | B1 * | 1/2003 | Dommety et al. ........... 370/328 |
| 6,518,533 | B1 | 2/2003 | Angelo et al. |
| 6,526,274 | B1 | 2/2003 | Fickes et al. |
| 6,538,635 | B1 | 3/2003 | Ringot |
| 6,542,730 | B1 | 4/2003 | Hosain |
| 6,577,350 | B1 | 6/2003 | Proehl et al. |
| 6,590,865 | B1 | 7/2003 | Ibaraki et al. |
| 6,597,374 | B1 | 7/2003 | Baker et al. |
| 6,622,175 | B1 | 9/2003 | Piller |
| 6,643,781 | B1 | 11/2003 | Merriam |
| 6,662,023 | B1 | 12/2003 | Helle |
| 6,687,497 | B1 | 2/2004 | Parvulescu et al. |
| 6,710,771 | B1 | 3/2004 | Yamaguchi et al. |
| 6,721,804 | B1 | 4/2004 | Rubin et al. |
| 6,742,027 | B1 | 5/2004 | Cromer et al. |
| 6,938,101 | B2 | 8/2005 | Hayes et al. |
| 6,968,379 | B2 | 11/2005 | Nielsen |
| 7,036,090 | B1 | 4/2006 | Nguyen |
| 7,036,091 | B1 | 4/2006 | Nguyen |
| 7,051,291 | B2 | 5/2006 | Sciammarella et al. |
| 7,091,998 | B2 | 8/2006 | Miller-Smith |
| 7,093,201 | B2 | 8/2006 | Duarte |
| 7,296,242 | B2 | 11/2007 | Agata et al. |
| 2001/0023445 | A1 | 9/2001 | Sundqvist |
| 2002/0002618 | A1 | 1/2002 | Vange |
| 2002/0007454 | A1 | 1/2002 | Tarpenning et al. |
| 2002/0010757 | A1 | 1/2002 | Granik et al. |
| 2002/0075305 | A1 | 6/2002 | Beaton et al. |
| 2002/0150048 | A1 | 10/2002 | Ha et al. |
| 2002/0194385 | A1 * | 12/2002 | Linder et al. ................ 709/250 |
| 2004/0010585 | A1 | 1/2004 | Jones et al. |
| 2005/0028208 | A1 | 2/2005 | Ellis |
| 2009/0106696 | A1 | 4/2009 | Duarte |

FOREIGN PATENT DOCUMENTS

| | | |
|---|---|---|
| WO | WO 98/36344 | 8/1998 |
| WO | WO 00/30003 | 5/2000 |

OTHER PUBLICATIONS

Bickmore, Andreas Girgenshon and Joseph W. Sullivan, Web Page Filtering and Re-Authoring for Mobile Users, The Computer Journal. vol. 42, No. 6, 1999, pp. 534-546.

J.C. Mogul, Server-Directed Transcoding, Computer Communications, Elsevier Science Publishers BV, Amsterdam, Feb. 1, 2001, pp. 155-162.

Henderson, R. C., et al., "A Taxonomy of Network Transcoding" Proceedings of the SPIE, vol. 3969, Jan. 24, 2000, pp. 65-72, XP008007261, ISSN: 0277-786X.

Fox, A., et al., "Adapting to Network and Client Variability Via On-Demand Dynamic Distillation" ACM Sigplan Notices, Association for Computing Machinery, vol. 31, No. 9, Sep. 1, 1996, pp. 160-170, XP000639230, ISSN: 0362-1340.

Mohan, R., et al., "Content Adaptation Framework: Bringing the Internet to Information Appliances" 1999 IEEE Global Telecommunications Conference Globecom 1999, Seamless Interconnection for Universal Services, vol. 4, Dec. 5, 1999, pp. 2015-2021, XP000951336, ISBN: 0-7803-5797-3.

Abrams, M., et al., "UIML: An Appliance-Independent XML User Interface Language" Proceedings of the International Conference on World Wide Web, May 11, 1999, pp. 1-14, XP002163485.

"CC/PP Attribute Vocabularies" W3C Jul. 21, 2000, XP002218349.

"Final Office Action", U.S. Appl. No. 11/502,264, (Apr. 3, 2009), 11 pages.

Excite Home Page, excite.com/, 1 page Aug. 1, 2000.

Alta Vista Home Page, altavista.com, 1 page Aug. 1, 2000.

Yahoo Home Page, yahoo.com/, 1 page Aug. 1, 2000.

Anita Komlodi, Key Frame Preview Techniques for Video Browsing, Digital Library Research Group, college of Library and Information Services, University of Maryland, pp. 118-125, 1998.

Appenzeller, et al.., "User-friendly Access Control for Public Network Ports", IEEE, pp. 699-707, Mar. 1999.

"Non-Final Office Action", U.S. Appl. No. 11/502,264, (Sep. 30, 2009), 15 pages.

* cited by examiner

PRESERVING SOCKET CONNECTIONS OVER A WIRELESS NETWORK

TECHNICAL FIELD

This application relates generally to the field of data processing systems, and more particularly, to maintaining a socket connection between a wireless device and a remote computer over a wireless network.

BACKGROUND

1. TCP/IP Sockets

The set of network protocols which enable communication over the Internet is sometimes referred to as the TCP/IP protocol suite, after its two most well known protocols: the Transmission Control Protocol ("TCP") and the Internet Protocol ("IP"). The TCP protocol, which resides at the "transport" layer of the Internet protocol stack, is a reliable, connection-oriented protocol which ensures that data arrives at its destination undamaged and in order. In addition, the TCP layer continuously measures network load and throttles its sending rate in order to avoid overloading the network. The IP protocol performs the basic task of moving packets of data from source to destination using IP addresses. IP can carry data for a number of different higher level protocols, each of which are identified by a unique IP Protocol Number.

In order to establish communication with a remote host on a TCP/IP network, a "socket" connection to the remote host must be established. A socket is defined by the combination of the IP address of the remote host and a port number identifying a remote application type. For example, port 80 is the standard port number for Hypertext Transport Protocol ("HTTP") traffic, and port 80 packets are typically processed by a Web server.

2. Wireless TCP/IP Networks

A variety of wireless messaging and personal information management (PIM) devices have been introduced over the past few years including, for example, the T-Mobile Sidekick II designed by the assignee of the present application. The TCP/IP protocol is used by many of these devices to communicate over wireless networks (e.g., the General Packet Radio Service ("GPRS") used on GSM networks). Consequently, in order to communicate with a remote host, these devices must open and maintain a socket connection to the remote host in the same manner as wired computer systems (e.g., PC desktops and notebooks).

One problem with this scenario is that, due to the inherent unreliability of wireless networks, wireless socket connections may not be suitable for certain types of applications. For example, stream-based applications such as Secure Shell ("SSH") connections require a significant amount of initialization overhead in order to establish (e.g., negotiating encryption variables, user authentication data, etc) and must be maintained over a relatively long period of time (i.e., in comparison to transaction-based applications such as Web browsing). For these types of connections, when a socket is closed (e.g., due to an unreliable wireless network) it is typically quite burdensome on the end user, who loses all state information associated with the connection and must then take the time to reestablish the connection with the remote server.

SUMMARY

Techniques are described for maintaining a socket connection over a wireless network. In one embodiment, a wireless data processing device for emulating a socket connection may include: a wireless radio for establishing a wireless communication channel with a wireless service provider over a wireless network; a network protocol stack including at least one layer configured to establish a socket connection with a remote server over the wireless network, the network protocol stack further including an application layer for executing applications capable of transmitting and receiving data over the socket connection; and a resumable socket module configured to emulate an open socket connection transparently to applications within the application layer, even when the wireless communication channel is temporarily lost, the resumable socket module counting a number of bytes transmitted or to be transmitted to the remote server and maintaining a buffer containing the bytes transmitted or to be transmitted.

BRIEF DESCRIPTION OF THE DRAWINGS

A better understanding of preserving socket connections over a wireless network can be obtained from the following detailed description in conjunction with the following drawings, in which.

DETAILED DESCRIPTION

Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Figure 1:
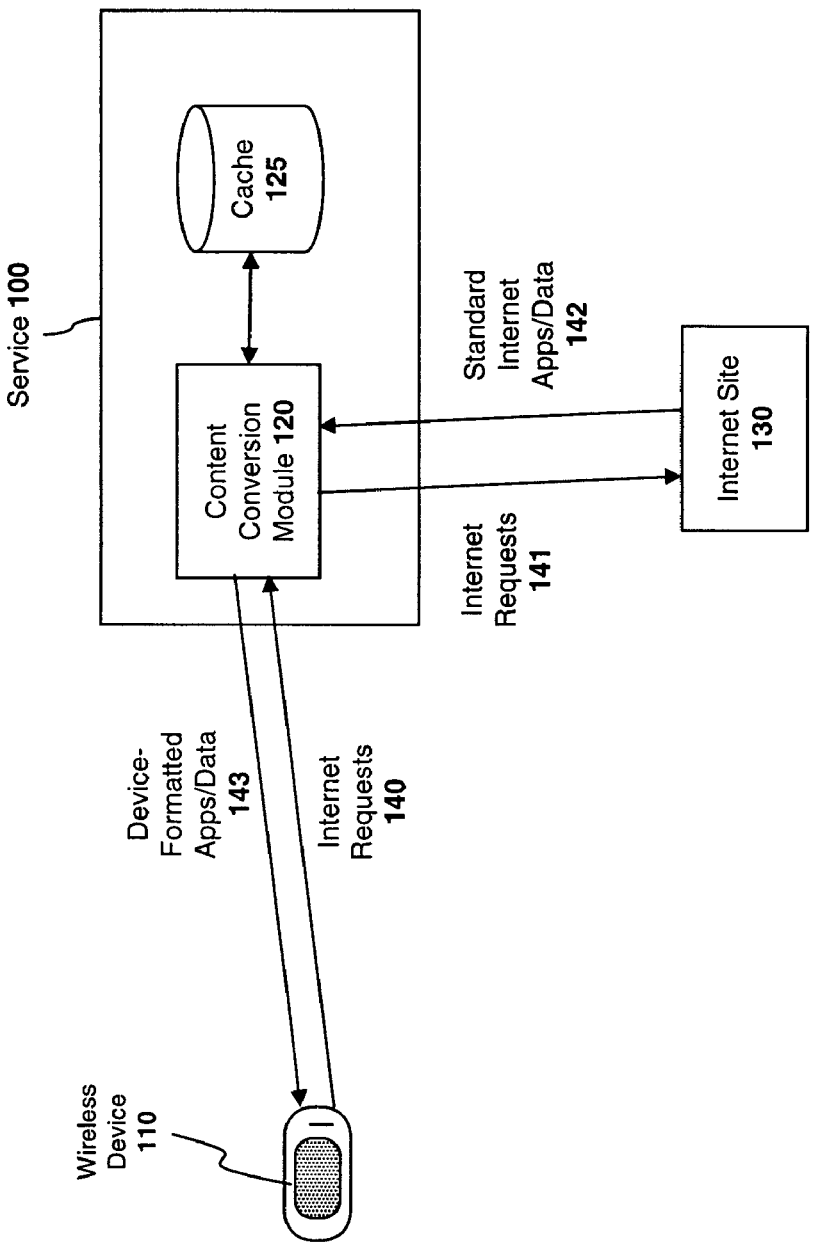
FIG. 1 illustrates a service communicating with a data processing device according to one embodiment of the invention.

Embodiments of the invention may be implemented on a wireless device 110 which communicates with a data processing service 100 as illustrated generally in FIG. 1. Embodiments of a service 100 and data processing device 110 are described in U.S. Pat. No. 6,721,804 entitled NETWORK PORTAL SYSTEM, APPARATUS AND METHOD, Ser. No. 09/714,897, filed Nov. 15, 2000, which is assigned to the assignee of the present application and which is incorporated herein by reference. Certain features of the service 100 and an exemplary data processing device 110 will now be described followed by a detailed description of a system and method for preserving socket connections over a wireless network. As an initial matter, however, it should be noted that the specific data processing device and system architecture described in U.S. Pat. No. 6,721,804 are not required for implementing the underlying principles of the invention. Rather, the embodiments of the invention described below may be implemented on virtually any type of data processing device including standard personal computers, personal digital assistants and wireless telephones.

In one embodiment, the service 100 converts standard applications and data into a format which each data processing device 110 can properly interpret. Thus, as illustrated in FIG. 1, one embodiment of the service 110 includes content conversion logic 120 for processing requests for Internet content 140. More particularly, the service 100 acts as a proxy for the data processing device 110, forwarding Internet requests 140, 141 to the appropriate Internet site 130 on behalf of the data processing device 110, receiving responses from the Internet site 130 in a standard Internet format (e.g., Web pages with embedded audio/video and graphical content, e-mail messages with attachments, . . . etc), and converting the standard Internet responses 124 into a format which the data processing device 110 can process (e.g., bytecodes as described in the co-pending applications).

For example, the conversion logic 120 may include a hypertext markup language ("HTML") rendering module (not shown) for interpreting HTML code and downloading any embedded content in the HTML code (e.g., graphics, video, sound, . . . etc) to the service 100. The conversion logic 120 may then combine the HTML code and embedded content and generate a set of bytecodes for accurately reproducing the requested content on the data processing device 110. As described above, in one embodiment, the bytecodes may be Java bytecodes/applets. However, the conversion logic 120 may generate various other types of interpreted and/or non-interpreted code, depending on the particular type of data processing device 110 being used (e.g., one with an interpreter module or one without).

Because one embodiment of the service 100 maintains an intimate knowledge of the capabilities/configuration of each data processing device 110 (e.g., screen size, graphics/audio capabilities, available memory, processing power, user preferences, . . . etc.) it can reconstruct the requested Internet content accurately, while at the same time minimizing the bandwidth required to transmit the content to the device 110. For example, the conversion logic 120 may perform pre-scaling and color depth adjustments to the requested content so that it will be rendered properly within the data processing device's 110's display. In making these calculations, the conversion may factor in the memory and processing power available on the data processing device 110. In addition, the conversion logic 120 may compress the requested content using a variety of compression techniques, and thereby preserve network bandwidth.

Figure 2:
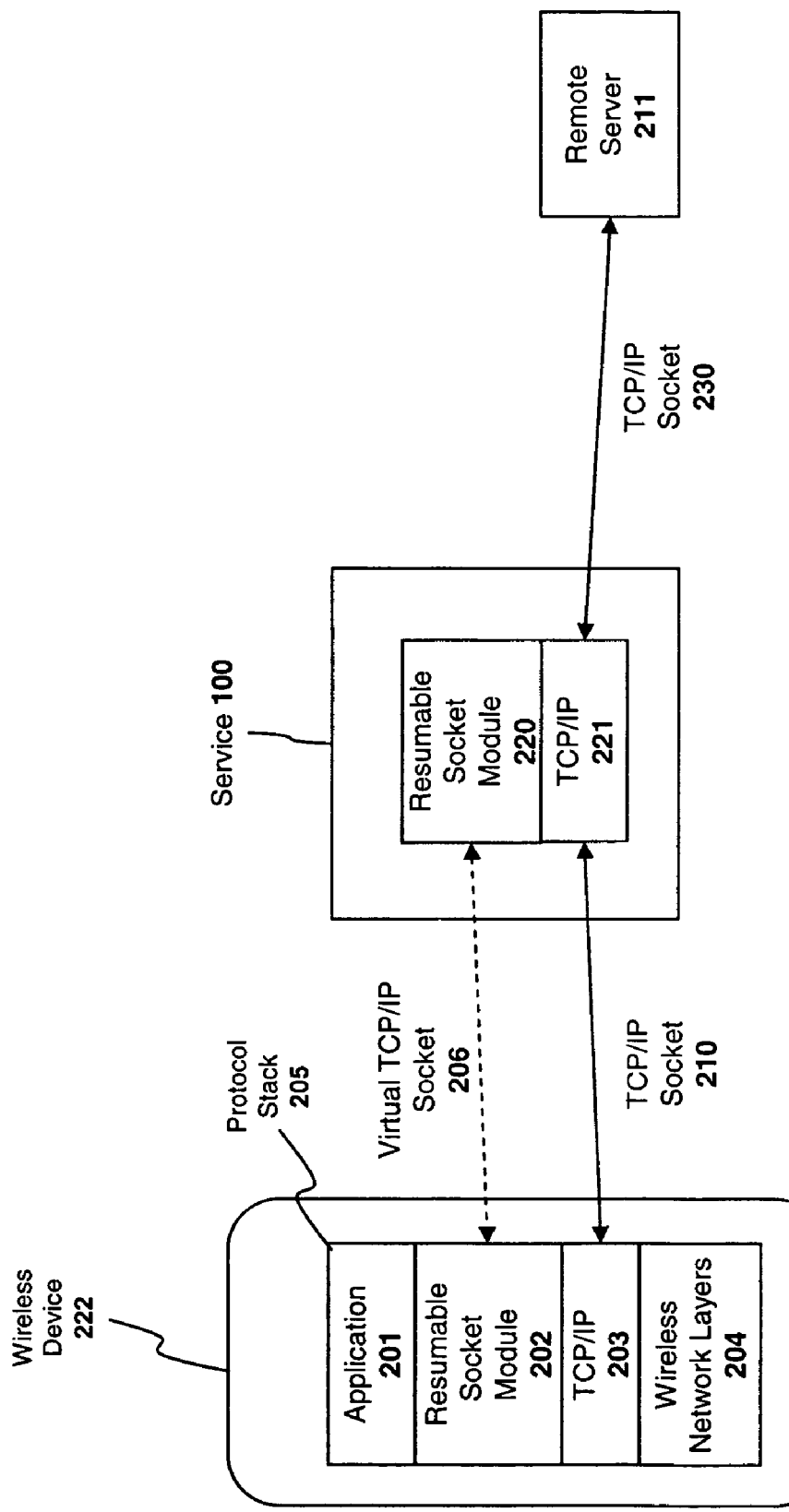
FIG. 2 illustrates a system employing resumable socket functionality according to one embodiment of the invention.

Techniques for emulating an open socket connection when wireless connectivity is temporarily lost are described. As illustrated in FIG. 2, in one embodiment, a resumable socket module 202 is configured above the TCP/IP layer 203 of the network protocol stack 205 on the wireless device 222. In this embodiment, the resumable socket module 202 acts as an interface between the TCP/IP layer 203 and applications 201 which employ network communication (e.g., SSH clients, Web browsers, email clients, etc). The client-side protocol stack 205 also includes a set of wireless network layers 204 that support wireless communication at the data link/physical tier of the OSI protocol stack (e.g., GPRS/GSM wireless network layers).

In one embodiment, the resumable socket module 202 coordinates with a corresponding service-side resumable socket module 220 at the data service 100 to emulate an open socket connection even when wireless connectivity is temporarily lost (illustrated in FIG. 2 as a "virtual" socket connection 206). Specifically, in one embodiment, the resumable socket modules 202 and 220 on the wireless device 220 and service 100, respectively, monitor the number of bytes transmitted and received between the application 201 and remote server 211. Even when the wireless device 222 loses network connectivity (e.g., due to the user moving out of range), the service 100 maintains an open socket connection 230 with the remote server 211 on behalf of the user. In one embodiment, the service 100 maintains the open socket connection 230 for a specified time period (e.g., 5 minutes). If the wireless device 222 reconnects to the wireless network within this specified time period, the resumable socket module 202 on the client and the resumable socket module 220 on the service 100 communicate with one another to synchronize the data transmitted/received. Thus, because the user's session with the remote server 211 is preserved, the user will not lose any session state information and will not be burdened with re-connecting and re-authenticating with the remote server.

In one embodiment, the TCP/IP layer 203 is implemented using the Java Application Programming Interface ("API") for TCP sockets. The resumable socket module 202 then communicates with the TCP/IP module by invoking methods via the Java sockets API. See, e.g., Calvert, TCP/IP Sockets in Java: Practical Guide for Programmers (Morgan Kaufmann 2002) for additional detail related to Java TCP socket implementations. It should be noted, however, that the particular type of program code used within the network stack 205 is not pertinent to the underlying principles of the invention.

Figure 3:
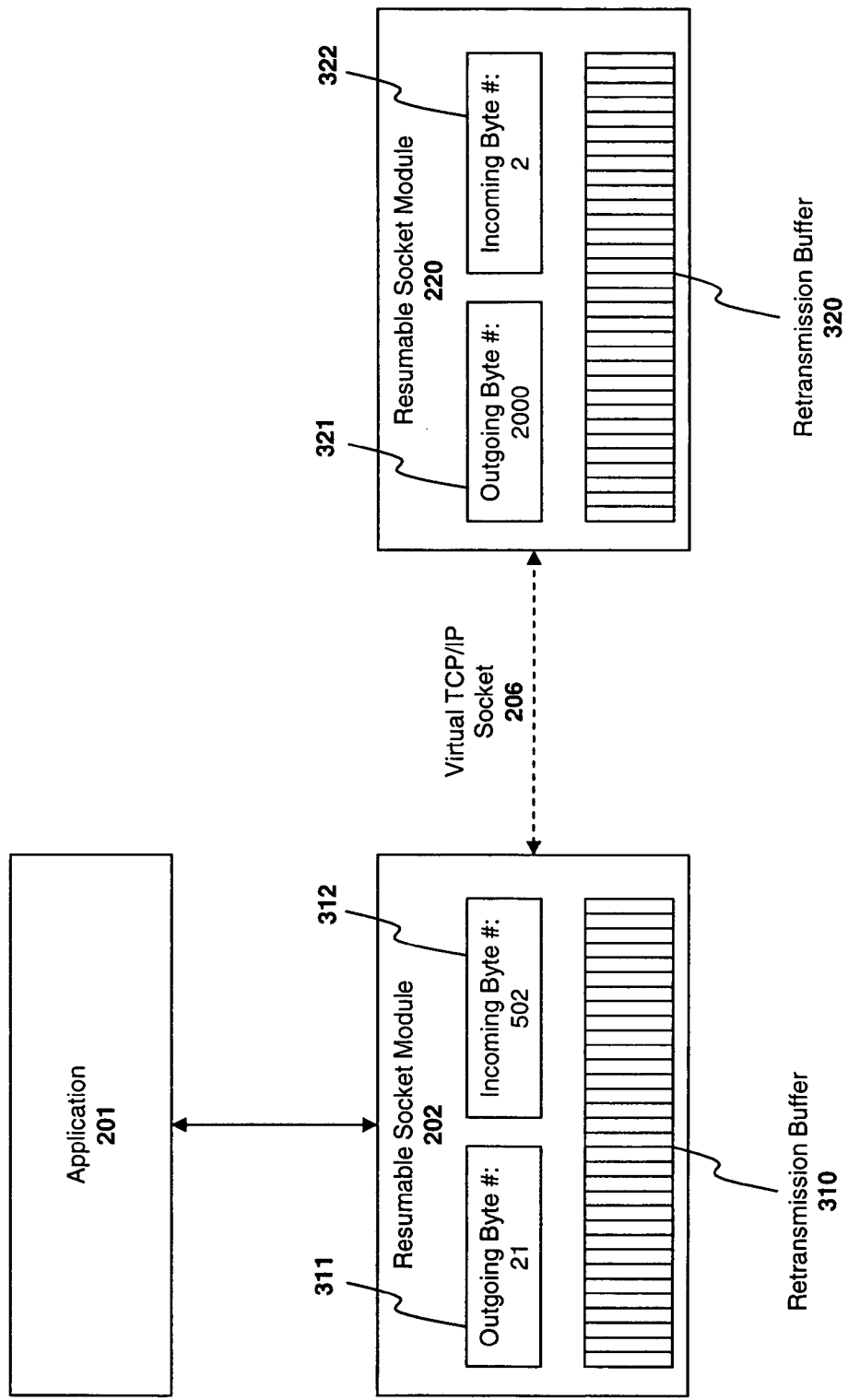
FIG. 3 illustrates a resumable socket module according to one embodiment of the invention.

FIG. 3 illustrates additional detail for implementing a virtual socket connection 300 between applications 201 and the resumable socket modules 202 and 220. In this embodiment, the resumable socket modules 202 and 220 count the and maintain an indication of the last byte transmitted and received. Specifically, counter modules 311 and 321 track the last byte transmitted from the device's resumable socket module 202 and the service's resumable socket module 220, respectively, and counter modules 312 and 322 maintain an indication of the last byte received from the device's resumable socket module 202 and the service's resumable socket module 220, respectively.

In addition, in one embodiment, retransmission buffers 310 and 320 are maintained by each of the resumable socket modules 202 and 220, respectively. The retransmission buffers 310 and 320 may be implemented as predefined regions in memory which store a specified number of bytes transmitted from resumable socket module 202 and resumable socket module 320, respectively (e.g., 32 kBytes, 16 kBytes, etc). This allows the resumable socket modules 202 and 220 to transmit the bytes stored therein in the event that the wireless connectivity of the wireless device is temporarily lost.

Figure 4:
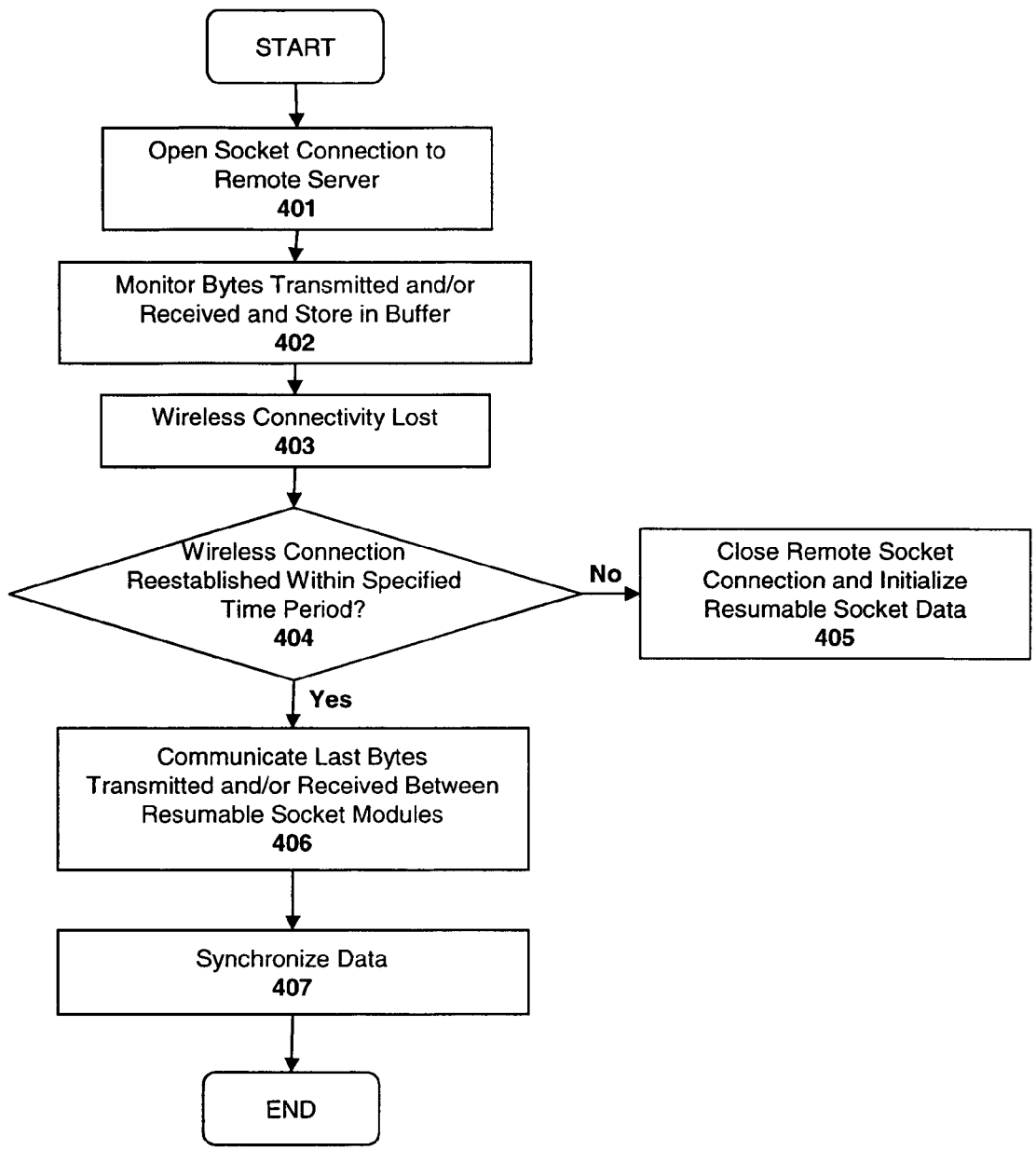
FIG. 4 illustrates a method for emulating an open socket connection according to one embodiment of the invention.

FIG. 4 illustrates a method for emulating an open socket connection performed by the resumable socket modules 202 and 220 on the wireless device 222 and service 100, respectively. At 401, a user establishes a TCP socket connection with a remote server (e.g., an SSH session via an SSH client). As mentioned above, this may involve the exchange of authentication data (e.g., user name and password) and/or encryption data (e.g., public/private keys).

At 402, the resumable socket modules on the wireless device 222 and the service 100 begin counting the number of bytes transmitted and received over the new socket connection and temporarily buffering the bytes transmitted. As mentioned above, this may be accomplished via counter modules 311, 312, 321, and 322; and retransmission buffers 310 and 320. At 403, the wireless device 222 loses it's connection to the wireless network. Nonetheless, at this stage, the resumable socket module 202 on the wireless device 222 emulates an open socket connection with the network application 201 on the wireless device and the resumable socket module 220 on the service 100 maintains the open socket connection with the remote server 211 on behalf of the wireless device 222. Thus, the socket connection is preserved notwithstanding the fact that the wireless network is temporarily unavailable.

As mentioned above, in one embodiment, the service 100 maintains the open socket connection 230 for a specified period of time (e.g., 5 minutes). If wireless connectivity is not reestablished with the wireless device 222 during that period of time, determined at 404, then at 405, the socket connection 230 with the remote server 211 is closed and the counter values and the raw data stored within the buffers 310, 320 within the resumable socket modules is cleared.

If, however, the device's wireless connectivity is reestablished with the specified period of time then, at 406, the resumable socket modules 202 and 220 communicate to identify the data that needs to be (re)transmitted from each of the retransmission buffers 310 and 320, respectively, and synchronize this data at 407. For example, in one embodiment, the resumable socket module 202 on the wireless device sends a message to the resumable socket module 220 on the service indicating the number of the last incoming byte that it received. The resumable socket module 220 on the service then transmits those bytes yet to be received by the resumable socket module 202 on the wireless device. For example, if the resumable socket module 202 on the wireless device indicates that the last byte that it received is byte #502 and the outgoing byte number stored within the outgoing counter 321 on the service is #2000, as illustrated in FIG. 3, then the resumable socket module 220 transmits bytes #503 to 2000 from the retransmission buffer 320. Alternatively, in one embodiment, the resumable socket module 220 on the service may first transmit an indication that the outgoing byte number stored in its outgoing counter 321 is #2000. In response, the resumable socket module 202 on the wireless device may request byte #'s 503 through 2000 from the resumable socket module 220 on the service 100, which resumable socket module 220 will then transmit. Various alternate/additional synchronization mechanisms may be employed while still complying with the underlying principles of the invention.

The resumable socket module 220 on the service may be brought up to date in the same manner as described above. For example, if the resumable socket module 220 on the service indicates that the last byte that it received is byte #2 and the outgoing byte number stored within the outgoing counter 311 on the wireless device is #21, then the resumable socket module 202 transmits bytes #3 through 21 from its retransmission buffer 310.

In one embodiment of the invention described above, the resumable socket module 202 appears as a normal TCP connection to the application, i.e., providing the same API as a standard TCP connection. As a result, these embodiments are implemented transparently to existing applications (i.e., without the need to modify the existing application and/or the socket API). When the underlying (i.e., real) TCP connection is broken, the application simply sees that no data has arrived for a period of time, and outgoing data is stored temporarily within the retransmission buffer. After the device reconnects to the wireless network, the application will see incoming data arriving again. If the device is not able to reconnect, the application simply sees the socket disconnected (i.e., a few minutes after it actually happened).

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, or other type of media/machine-readable medium suitable for storing electronic instructions. The present invention may be downloaded as a computer program which may be transferred from a remote computer (e.g., a server) to a requesting computer (e.g., a client) via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, although the embodiments described above are limited to a wireless implementation, the underlying principles of the invention may be employed in a variety of different types of networks. Similarly, while the protocol stack described above is implemented using Java, the underlying principles of the invention are not limited to any particular programming language.

What is claimed is:

1. A wireless device comprising:
   a network protocol stack including at least one layer configured to establish an open socket connection with a remote server via a wireless communication channel established over a wireless network, the network protocol stack including an application layer operable to execute one or more applications configured to transmit and receive data over the open socket connection; and
   a device resumable socket module configured to:
      emulate the open socket connection to the one or more applications when connectivity of the wireless communication channel is lost, the open socket connection emulated via a virtual socket connection between the device resumable socket module and a service resumable socket module, the device resumable socket module including a device byte counter configured to track device transmitted data bytes to the remote server and track device received data bytes from the remote server, the service resumable socket module including a service byte counter configured to track server transmitted data bytes to the wireless device and track server received data bytes from the wireless device; and
      synchronize with the service resumable socket module to resume the open socket connection when the connectivity of the wireless communication channel is reestablished, the device resumable socket module and the service resumable socket module synchronized based at least in part on:
         retransmission of the device data bytes to the remote server, the device data bytes being stored in a buffer and selected for the retransmission based on the device byte counter tracking the device transmitted data bytes to the remote server, and based on the service byte counter tracking the server received data bytes from the wireless device; and
         reception of the server data bytes from the remote server, the server data bytes being stored in a remote buffer and transmitted to the wireless device based on the service byte counter tracking the server transmitted data bytes to the wireless device, and based on the device byte counter tracking the device received data bytes from the remote server.

2. A wireless device as recited in claim 1, wherein the device resumable socket module is further configured to identify a last server transmitted data byte received by the wireless device and a last device transmitted data byte transmitted to the remote server.

3. A wireless device as recited in claim 1, wherein the service resumable socket module is further configured to identify a last device transmitted data byte received by the remote server and a last server transmitted data byte transmitted to the wireless device.

4. A wireless device as recited in claim 1, wherein the open socket connection is closed by the service following a period of time after the wireless communication channel is lost.

5. A wireless device as recited in claim 4, wherein the device resumable socket module is further configured to determine if the open socket connection was closed while the wireless communication channel was lost.

6. A computer implemented method comprising:
  establishing a wireless communication channel with a wireless device over a wireless network;
  establishing an open socket connection with a remote server over a data network on behalf of the wireless device responsive to a request to communicate with the remote server from the wireless device;
  emulating the open socket connection when connectivity of the wireless communication channel is lost, the open socket connection emulated via a virtual socket connection between a device resumable socket module and a service resumable socket module, the device resumable socket module including a device byte counter configured to track device transmitted data bytes to the remote server and track device received data bytes from the remote server, the service resumable socket module including a service byte counter configured to track server transmitted data bytes to the wireless device and track server received data bytes from the wireless device; and
  synchronizing with the device resumable socket module on the wireless device to resume the open socket connection when connectivity of the wireless communication channel is reestablished, the service resumable socket module and the device resumable socket module synchronized based at least in part on:
    retransmission of the server data bytes to the wireless device, the server data bytes being stored in a buffer and selected for the retransmission based on the service byte counter tracking the server transmitted data bytes to the wireless device, and based on the device byte counter tracking the device received data bytes from the remote server; and
    reception of the device data bytes from the wireless device, the device data bytes being stored in a device buffer and transmitted based on the device byte counter tracking the device transmitted data bytes to the remote server, and based on the service byte counter tracking the server received data bytes from the wireless device.

7. A computer implemented method as recited in claim 6, further comprising:
  identifying a last server transmitted data byte received by the wireless device and a last device transmitted data byte transmitted to the remote server; and
  identifying a last device transmitted data byte received by the remote server and a last server transmitted data byte transmitted to the wireless device.

8. One or more computer-readable storage media comprising instructions that are executable to implement a device resumable socket module that is configured to:
  count a number of bytes transmitted to a remote server via an open socket connection established with the remote server over a wireless communication channel to identify a last byte transmitted to the remote server;
  emulate the open socket connection to one or more applications of an application layer in a network protocol stack when connectivity of the wireless communication channel is lost, the open socket connection emulated via a virtual socket connection between the device resumable socket module and a service resumable socket module, the device resumable socket module including a device byte counter configured to track device transmitted data bytes to the remote server and track device received data bytes from the remote server, the service resumable socket module including a service byte counter configured to track server transmitted data bytes to the wireless device and track server received data bytes from the wireless device; and
  synchronize with the service resumable socket module to resume the open socket connection when the connectivity of the wireless communication channel is reestablished, the device resumable socket module and the service resumable socket module synchronized based at least in part on:
  retransmission of the device data bytes to the remote server, the device data bytes being stored in a buffer and selected for the retransmission based on the device byte counter tracking the device transmitted data bytes to the remote server, and based on the service byte counter tracking the server received data bytes from the wireless device; and
  reception of the server data bytes from the remote server, the server data bytes being stored in a remote buffer and transmitted to the wireless device based on the service byte counter tracking the server transmitted data bytes to the wireless device, and based on the device byte counter tracking the device received data bytes from the remote server.

9. One or more computer readable storage media as recited in claim 8, wherein the device resumable socket module is further configured to identify a last server transmitted data byte received by the wireless device and a last device transmitted data byte transmitted to the remote server.

10. One or more computer readable storage media as recited in claim 8, wherein the service resumable socket module is further configured to identify a last device transmitted data byte received by the remote server and a last server transmitted data byte transmitted to the wireless device.

11. One or more computer readable storage media as recited in claim 8, wherein the open socket module is closed by the service following a period of time after the wireless communication channel is lost.

12. One or more computer readable storage media as recited in claim 11, wherein the device resumable socket module is further configured to determine if the open socket connection was closed while the wireless communication channel was lost.

* * * * *